United States Patent
Cassatt et al.

[11] Patent Number: 5,816,761
[45] Date of Patent: Oct. 6, 1998

[54] LIGHTWEIGHT STRUCTURAL BLIND FASTENER

[75] Inventors: Gary G. Cassatt, Debry; R. Todd Briscoe, Benton, both of Kans.

[73] Assignee: The Boeing Company, Seattle, Wash.

[21] Appl. No.: 744,672

[22] Filed: Nov. 6, 1996

Related U.S. Application Data

[63] Continuation-in-part of Ser. No. 587,159, Jan. 11, 1996.

[51] Int. Cl.$^6$ .............................. F16B 13/04; F16B 13/06
[52] U.S. Cl. ................................ 411/34; 411/38; 411/39; 411/43; 411/54; 411/55
[58] Field of Search .................................. 411/34, 36, 37, 411/38, 39, 40, 41, 42, 43, 44, 54, 55, 69, 70, 361

[56] References Cited

U.S. PATENT DOCUMENTS

| | | |
|---|---|---|
| 2,887,003 | 5/1959 | Beilmyer . |
| 2,971,425 | 2/1961 | Blakeley . |
| 3,063,329 | 11/1962 | Vaughn . |
| 3,262,353 | 7/1966 | Waeltz et al. .............................. 411/39 |
| 3,322,449 | 5/1967 | Becker . |
| 3,461,771 | 8/1969 | Briles . |
| 3,643,544 | 2/1972 | Massa . |
| 3,858,479 | 1/1975 | Sekhorn . |
| 4,089,247 | 5/1978 | Dahl et al. . |
| 4,142,439 | 3/1979 | Landt . |
| 4,237,768 | 12/1980 | Volkmann .................................. 411/54 |
| 4,457,652 | 7/1984 | Pratt . |
| 4,556,351 | 12/1985 | Wollar et al. .............................. 411/38 |
| 4,579,491 | 4/1986 | Kull . |
| 4,595,324 | 6/1986 | Sadri . |
| 4,627,775 | 12/1986 | Dixon . |
| 4,639,175 | 1/1987 | Wollar ........................................ 411/43 |
| 4,659,271 | 4/1987 | Pratt et al. . |
| 4,747,202 | 5/1988 | Beals . |
| 4,772,167 | 9/1988 | Beals . |
| 4,832,548 | 5/1989 | Strobel . |
| 4,865,499 | 9/1989 | Lacey . |
| 4,877,363 | 10/1989 | Williamson et al. ...................... 411/55 |
| 4,900,205 | 2/1990 | Sadri . |
| 4,919,577 | 4/1990 | Binns . |
| 4,950,115 | 8/1990 | Sadri . |
| 4,967,463 | 11/1990 | Pratt . |
| 4,968,198 | 11/1990 | Binns . |
| 5,066,179 | 11/1991 | Pratt . |
| 5,178,502 | 1/1993 | Sadri ......................................... 411/43 |
| 5,213,460 | 5/1993 | Sadri et al. . |
| 5,238,342 | 8/1993 | Stencel . |

*Primary Examiner*—Kenneth J. Dorner
*Assistant Examiner*—Robert G. Santos
*Attorney, Agent, or Firm*—John C. Hammar

[57] ABSTRACT

We achieved extended fatigue endurance and high pre-load in a structural blind fastener by combining the best features of screw type and pull type blind fasteners. We replaced fatigue critical details from the shear plane with close tolerance, slip fit, core bolt and outer bolt shanks to obtain the desired structural load paths while retaining anchoring features of screw type fasteners to introduce adequate pre-load. Our fasteners are compatible with currently available blind bolt insertion tooling. The present invention pertains to a lightweight version of the structural blind fastener wherein we set the backside anchor collar with matching threads that engage between the outer sleeve bolt and inner core bolt.

4 Claims, 1 Drawing Sheet

LIGHTWEIGHT STRUCTURAL BLIND FASTENER

REFERENCE TO RELATED APPLICATION

The present application claims the benefit of U.S. Provisional Application 60/006,250 entitled "Structural Blind Fastener," filed Nov. 7, 1995, now abandoned. It is also a continuation-in-part application based upon U.S. patent application Ser. No. 08/587,159, filed Jan. 11, 1996.

TECHNICAL FIELD

The present invention relates to a lightweight fastener for joining two or more elements in aerospace structure, and, more particularly, to a structural blind fastener that can be manipulated on one side of the assembly to clamp up to a fatigue strength comparable to a solid bolt.

BACKGROUND ART

Conventional blind fasteners generally lack the tension or shear capabilities achievable with conventional solid bolts because the blind fasteners include an internal screw, pull stem, or other detail in the shear plane to disturb the principal load carrying paths in shear or tension. Conventional solutions to achieve comparable shear and tension performance usually involve substituting exotic high strength materials, such as Inconel, for the titanium or steel alloys commonly used in fasteners for primary aerospace structure. These exotic materials introduce cost and weight penalties and may pose corrosion problems. The exotic fasteners still have inferior fatigue endurance than bolts because of internal threads in the shear plane or other features. The key factors in fatigue endurance are pre-load (clamp-up) and absence of fatiguable features in the shear plane. The clamp up force generates friction between the elements so that they resist movement. Some blind fasteners have removed details, like threads, from the shear plane, but, in doing so, have sacrificed pre-load capacity because they have removed any threaded portions from the fastener. Therefore, such blind fasteners also have inferior fatigue endurance.

The blind fastener industry today has two basic fastener types. With a screw type blind fastener, you achieve excellent pre-load using a buckling upset sleeve approach by turning a threaded core bolt in a drive nut. Fasteners of this screw type are illustrated in U.S. Pat. Nos. 4,858,479; 4,457,652; 4,579,491; 4,659,271; 4,772,167; 4,900,205; 4,919,577; 4,950,115; 4,967,463; 4,968,198; 5,066,169; and 5,238,342 which we incorporate by reference. In the screw type blind fastener, threads extend across the shear plane.

Pull type blind fasteners use a solid shank pin inside a hollow shank bolt. The shear plane may lack any fatigue critical details, like threads, but the conventional designs that rely on pulling force for pre-load provide inferior pre-load than achievable with screws or bolts. Pull type blind fasteners are described in U.S. Pat. Nos. 4,089,247; 4,142,489; and 4,865,499 which we incorporate by reference. The absence of adequate pre-load means that the joint can move too easily along the axis of the core bolt and such a joint remains prone to fatigue.

Blind fasteners have found almost no acceptance in aerospace primary structural assemblies because of their inferior fatigue endurance. In previous attempts to reduce localized stress at the thread root, fastener manufacturers have tried to improve the thread detail in the bolt body to a sinusoidal profile or to increase the wall thickness of the outer bolt to reduce field stress at the thread root. These attempts failed to increase the fatigue endurance adequately. Therefore, there remains a need for a blind structural fastener that will provide fatigue endurance comparable to a conventional bolt. The need is magnified by automated assembly processes that would greatly benefit from the ability to set fasteners with access to only one side. The present invention describes such a structural blind fastener.

Achieving adequate clamp-up and increased fatigue life, however, are not the only requirements that the structural blind fastener must satisfy to achieve widespread use in aerospace structure. The fastener must also be as light as possible so as not to introduce significant weight penalties over conventional two-sided fasteners and bolts or rivets. Also, the fasteners must be manufacturable at relatively low cost so that the cost savings promised by automation are not consumed by the increased cost of the fasteners.

In U.S. patent application Ser. No. 08/587,159, we described a structural blind fastener that achieved comparable or better fatigue endurance to conventional aerospace bolts by combining (1) a well-controlled pre-load of high magnitude comparable to the pre-load obtainable with screw type blind fasteners or conventional bolts with (2) elimination of fatigue critical details from the shear plane. The fasteners permitted the automated assembly of aerospace primary structure with access to only one side of the elements and with tremendous reduction in the average fastener insertion and setting time.

That fastener also removed fatigue critical details from the shear plane and replaced them with a combination of a smooth wall outer bolt and a sliding, smooth wall core bolt. The outer bolt fit snugly in the bore hole to within close tolerance while permitting slip fit insertion until a setting collar contacted the drive side element on the periphery surrounding the bore hole. The outer bolt was essentially a modified aircraft bolt having a bore drilled through the head and a taper cut onto the blindside end. The outer bolt could be inserted into bores having interference with the bolt diameter using an impact action, such as a rivet setting gun. The internal bore of the outer bolt included a threaded section that mated with a corresponding thread on the blindside shank of the inner core bolt for drawing up and setting the fastener anchor without requiring rotation of the outer bolt. This arrangement permitted larger mismatch between the core bolt diameter and straightness and that of the bore in the outer bolt. This fastener saved weight by minimizing the weight of the anchoring elements.

The core bolt preferably was a smaller variant of an aircraft tension bolt received in the bore of the outer bolt with a close tolerance slip fit. The core bolt had a threaded portion on the drive side to allow a conventional high strength aircraft nut or collar to screw down on the drive side against the setting collar of the outer bolt. Screwing down the core bolt expanded a setting or anchor sleeve carried on the core bolt on the back side when threads on the backside shank of the core bolt engaged the internal threads of the outer bolt. Setting the fastener generated a controlled, high magnitude pre-load. The sleeve preferably was a metal tube such as the one commonly used with the Monogram Composi-Lok® fastener. Of course, alternate designs to achieve the desired pre-load are available, including a traveling nut on the blindside. Critical in this fastener's design was the combination of a smooth bore through the shear plane with a screw type installation that permitted high pre-load.

A method for achieving a blind structural fastener having adequate fatigue endurance for acceptance in aerospace primary structure involves (1) positioning a combination of a close tolerance slip fit outer bolt shank and inner sliding core bolt shank across the shear plane of abutting structural elements and (2) applying adequate pre-load with blindside clamp up means (including mating threads outside the shear plane) to obtain the desired fatigue endurance. The fastener of U.S. patent application Ser. No. 08/587,159, achieved fatigue endurance comparable to conventional aerospace bolts.

A need remains for a lighter weight fastener having fatigue endurance with adequate pre-load comparable to the fastener described in U.S. patent application Ser. No. 08/587,159.

SUMMARY OF THE INVENTION

In a structural blind fastener, we reduce the overall weight without sacrificing strength or pre-load by having matching threads on the core bolt and shank bolt mate on the blindside to set the fastener. The frontside becomes a flush head or protruded head with a flange of the outer bolt reacting against the periphery of the bore through the fastened parts. The joint is comparable in strength and performance to those described in the U.S. patent application Ser. No. 08/587,159, but the fastener is lighter.

DETAILED DESCRIPTION OF A PREFERRED EMBODIMENT

The structural blind fastener of the present invention combines the best features of screw type and pull type blind fasteners to produce a fastener having controlled pre-load of high magnitude and superior fatigue endurance with minimized weight. The static and joint fatigue performance is comparable to the performance of state-of-the-art solid shank bolts which the fastener of the present invention is targeting to replace. To achieve these performance goals, the structural blind fastener of the present invention removes fatigue critical details, like threads, from the shear plane while retaining means for pre-loading the joint during fastener setting to a pre-load comparable to bolts. The structural blind fastener comprises:

(a) an outer hollow bolt sized for a close tolerance slip fit with the aligned bores in the assembled structural elements and having threads on the inner bore on the blindside end;

(b) an inner core bolt sized for a close tolerance slip fit in the bore of the hollow bolt and having indexed, mating threads on the blindside shank between a blindside head and the shear plane;

(c) an anchor sleeve on the blindside end of the core bolt for engaging the blindside head and expanding when the fastener is set to anchor the blindside (or any other suitable alternative capable of providing the necessary pre-load); and (d) optionally, a conventional self-locking, high strength, aircraft drive nut mating on matching threads at the drive end.

The blindside threads mate and move together when the fastener is set to pull the core bolt inward from the back side. Movement of the core bolt buckles or expands the anchor sleeve on the blindside to achieve the desired pre-load for the joint. The threads on the blindside are outside the shear plane and are removed from the high bending moment which characterizes aerospace structural joints.

We believe that a solid shank pin on the core bolt in combination with the hollow outer bolt sized for a close tolerance slip fit (or slight interference fit) with the bore produces the improved fatigue endurance. Our analysis shows that the structural blind fastener will have comparable or better fatigue endurance than a conventional solid bolt, such as a Hi-Lok® shear bolt.

Figure 1:
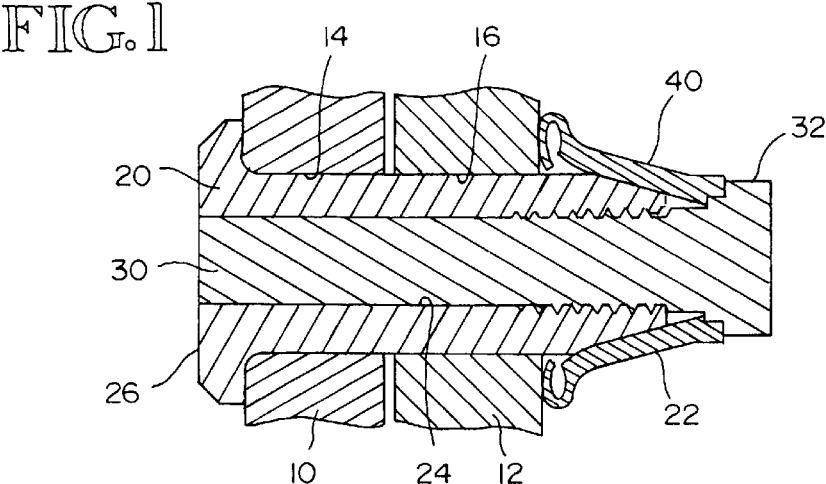
FIG. 1 is a schematic sectional view of a joint using a preferred blindside structural fastener of the present invention.
Figure 2:
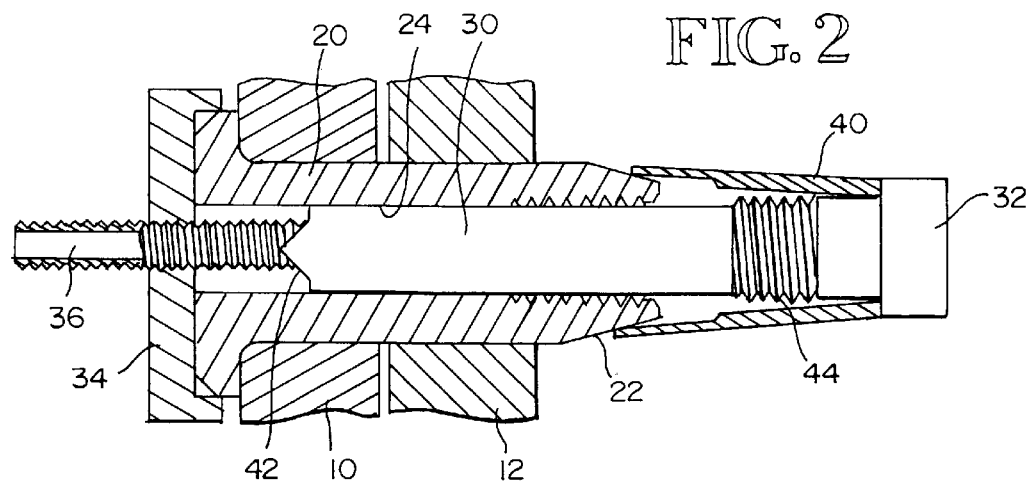
FIG. 2 is a schematic sectional view of a fastener of the present invention ready for setting in a bore.
Figure 3:
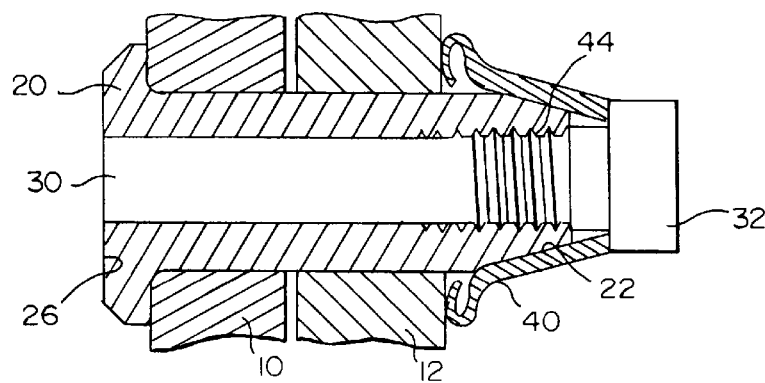
FIG. 3 is a schematic sectional view of the set fastener of FIG. 2 having the core bolt and shank bolt mating threads fully engaged while lying entirely outside the shear plane of the joint.

FIG. 1 shows two structural elements 10 and 12 assembled in abutting fashion so that bores 14 and 16 align to define a bore hole having a drive side and a blind or back side. Typically the structural elements 10 and 12 may be components of an engine strut for a transport airplane where they would typically be aluminum or titanium alloy or an aluminum, titanium, steel combination. Typical assemblies include aluminum web to titanium spar chords or aluminum web to titanium understructure in strut upper spar assemblies or titanium skin to steel spar, titanium skin to titanium and aluminum understructure, or titanium skin to titanium upper spar chords in strut side skin assemblies, or similar applications. The bore hole is filled with a hollow outer bolt 20 and a core bolt 30 sized to fit snugly in the bore of the outer bolt 20 with a close tolerance slip fit. The smooth walls of the outer bolt and the core bolt in the portion aligned with the shear plane eliminate any fatigue critical details in the shear plane, so the fastener functions similarly to a solid shank bolt. The outer bolt is usually steel or titanium while the core bolt may be steel or titanium.

We can make the outer shank bolt 20 from a modified aircraft quality bolt of the proper dimension by cutting a taper 22 on the blind end of the outer bolt 20. Then, we bore a close tolerance hole 24 down the center of the outer bolt 20 to accommodate the core bolt 30. Finally, we thread a portion of the bore adjacent the blindside end, but outside the shear plane of the joint, when the fastener is set. On the drive end, the outer bolt includes a seating collar 26 of dimension greater than the bore hole for retaining the outer bolt on the drive side. The collar 26 shown is a protruding head have wrench flats, but a countersunk collar of conventional bolt design might readily be substituted, as those of ordinary skill will understand.

The core bolt 30 uses existing blind fastener technology. In the shear plane, the core bolt has a shank that is smooth (matching the bore of the outer bolt 20) and sized for a close tolerance slip fit. The blind end of the core bolt 30 has an enlarged "Tee" head 32 for retaining an anchor sleeve 40 during pull-up where the sleeve 40 buckles or expands to anchor the fastener with high pre-load. The buckled anchor sleeve 40 and "Tee" head 32 together functionally constitute the equivalent of a nut on the blindside. This preferred anchor assembly is comparable to the Monogram Composi-Lok® anchor. Accordingly, other anchoring means can be substituted while retaining the described function. For example, a traveling nut might mate with matching threads on the end of the core bolt to impart the buckling force on the anchor sleeve 40. The anchor sleeve 40 is sized so that it fits snugly around the core bolt 30 above the taper 22 of the outer bolt 20 to allow easy installation. During setting, the core bolt 30 slides inwardly in the bore of the shank bolt 20 as a matching thread 44 on the core bolt 30 engages with the inner thread of the outer bolt. Now with reference to FIG.

2, to set the fastener we engage a low profile nut 34 with the wrench flats on the collar 26 of the outer bolt 20 to index them together. We, then, turn the core bolt 30 so that matching threads on the drive stem 36 and the inside of the nut draw the core bolt inward. The mating threads on the drive end of the core bolt and the nut are of the same pitch as corresponding threads on the blindside end. By turning the drive stem, the core bolt will be drawn inward toward the drive side to buckle the backside sleeve 40 and mate with the blindside core bolt and outer bolt threads. When the sleeve is fully buckled and the blindside mating threads are fully engaged, the installation is complete. Additional torque applied to the core bolt will cause the drive stem 36 to shear at the breakneck groove 42. We break off the drive stem 36 by applying a torsional overload after bolt setting to further minimize the weight. The break occurs at a breakneck groove 42, usually flush with the collar or slightly inside the collar. U.S. Pat. No. 4,659,271 describes such a drive stem.

With the fastener set, we disengage the nut and collar and discard the nut and sheared drive stem.

We usually include a conventional insert tube between the core bolt shank and anchor sleeve to ensure that the anchor sleeve buckles outwardly properly.

Our structural blind fastener uses proven technology to achieve adequate pre-load while minimizing shear plane compromise without increasing the likelihood of fatigue failures over competing conventional designs. The joint fatigue strength and fatigue endurance is comparable to a solid bolt.

Our structural blind fastener still functions properly when installed into undersized bores which result in up to about 0.003 inches of interference, because of the relatively thick outer wall of the outer shank bolt. Prior art fasteners struggle with undersized, interference bores of this type and they can only be used in limited circumstances and then, with relatively unpredictable installation reliability/confidence. Our structural blind fastener offers a synergistic design using a smooth bore, thick outer body that is undisturbed by interference fit applications. Screw-type fasteners usually bind because of their threads in such interference bores necessitating rework to redrill the bore. Our fastener also retains the pre-load clamp up features of screw type fasteners and removes all fatigue critical details from the working portion of the fastener (i.e., from the shear plane where loads are transferred). This unique combination provides structural performance and fatigue endurance comparable to solid shank aircraft bolts while retaining the installation and automation advantages of blind fasteners.

The fastener construction and alloys are otherwise in keeping with conventional designs and practices of the art as illustrated in the patents we earlier incorporated by reference.

Our fasteners function well with up to about 2° off-axis bores and with backside relief angles of up to 7 degrees.

The structural blind fastener is designed to match or exceed the performance of a shear head aircraft bolt. Accordingly, it should have a shear strength measured according to MIL-STD-1312, test 13, of at least about 95 ksi for a 0.25 inch fastener and a tension strength measured according to MIL-STD-1312, test 8, comparable to a shear Hi-Lok® bolt. We measure pre-load according to MIL-STD-1312, test 16, with a goal of 50% of $F_{tu}$ of the core bolt capability. The minimum pre-load for 0.25 inch shear fasteners is 1500 lbs, but we prefer fasteners with pre-load exceeding 2500 lbs.

Our structural blind fastener performs other critical structural tests as well or better than conventional solid shank aircraft bolts including tests for tension fatigue, vibration, single lap shear, low load/high load joint fatigue, locking torque, and sheet pull-up (typically measured in accordance with the corresponding MIL-STD-1312 test). These outstanding structural characteristics make our blind fastener acceptable and attractive for automated assembly operations using conventional and available bolt insertion tooling. We can reduce fastener installation to about 25–33% of the time presently required for solid, two-piece bolt installations.

Our fastener also reduces assembly damage during installation because it eliminates blindside nut tools and improves mating surface contact through higher clamp-up forces (pre-load). With controlled installation torque, we reduce assembly variation from fastener to fastener. Our assembled products are better and cheaper to manufacture, although there is a slight weight penalty imposed with a blind fastener over a solid shank bolt.

We believe our fastener will provide the same or better performance to the performance we measured for the fasteners of U.S. patent application Ser. No. 08/587,159 filed Jan. 11, 1996, for STRUCTURAL BLIND FASTENER, which we incorporate by reference.

For a countersunk configuration, the nut 34 need not be rigidly indexed with the collar. It need only be held stationary while the core bolt is rotated to set the fastener.

As an alternative to use of a breakneck groove, the fastener can be set using a predetermined torque. The drive nut can be removed and the protruding core bolt cut off flush with the collar.

When setting begins, the blindside threads have yet to engage. As the core bolt is drawn in with the drive side threads, the blindside threads then engage. If the blindside threads were engaged initially either the fastener is longer than necessary (thereby introducing a weight penalty) or there is risk that the blindside threads will extend into the shear plane (thereby jeopardizing the structural quality of the joint).

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. In an aerospace structural assembly comprising at least two structural elements joined with at least one fastener, a method for stabilizing the shear plane defined by the interface of the two elements to extend the fatigue life of the fastener because the set fastener has a joint fatigue strength comparable to the fatigue strength of a conventional solid bolt, the method comprising the steps of:

(a) aligning corresponding bores in the two elements to define a bore hole crossing the shear plane and to define a drive side element and a blindside element;

(b) inserting a core bolt within a hollow portion of an outer bolt to fill the hollow with a thread-free, detail-free, smooth interface in the shear plane when the outer bolt is set;

(c) from the drive side only, inserting the hollow outer bolt with the core bolt into the bore hole to contact the walls of the bores with a smooth bolt surface free of threads or other details across the entire shear plane when the bolt is set, the outer bolt being stopped in position by a collar that seats against the drive side element; and (d) from the drive side only, setting the core bolt to clamp up the joint by sliding the core bolt within the outer bolt to expand an anchor sleeve on the blindside between a head of the core bolt and the blindside element to obtain a pre-load comparable to a solid shank bolt, the setting occurring by threads on the blindside of the core bolt outside the shear plane mating with matching threads on the inner surface of the blindside end of the outer bolt so that the set fastener is free of details in the shear plane.

2. A blind structural fastener for joining at least two structural elements to provide a fatigue strength comparable to a conventional solid bolt, the strength arising from removal of threads or other details commonly used in conventional blind fasteners in the shear plane defined by aligned bores on the abutting elements, comprising:

(a) a hollow outer bolt having
 a smooth outer surface to fit snugly within the aligned bores across the shear plane,
 a concentric longitudinal, smooth bore in the shear plane for receiving a core bolt,
 a threaded portion adjacent a blindside end, and
 a seating collar near a drive side end;

(b) a core bolt slip fit within the bore of the outer bolt with a smooth shank in the shear plane to match the outer bolt in the shear plane so that the installed fastener is thread-free and detail-free across both the outer bolt and the core bolt in the shear plane, the core bolt including an enlarged tee head and a threaded portion adjacent the tee head for mating with the threads on the blindside end of the outer bolt; and (c) means for pre-loading the core bolt and the outer bolt combination to achieve a fatigue strength for the fastener comparable to a conventional smooth solid shank bolt, the pre-loading means allowing driving from the drive side while creating a clamping fixture to anchor the fastener on the blindside, the pre-loading means including an anchor sleeve slip fit on the core bolt wherein the anchor sleeve buckles between the tee head of the core bolt and the structural element on the blindside when the fastener is set.

3. A fastened joint made in accordance with the method of claim 1.

4. The method of claim I wherein the outer bolt has an interference fit of up to about 0.003 inches with the bore hole.

* * * * *